(12) United States Patent
Moon (10) Patent No.: US 10,423,650 B1
(45) Date of Patent: Sep. 24, 2019

(54) SYSTEM AND METHOD FOR IDENTIFYING PREDICTIVE KEYWORDS BASED ON GENERALIZED EIGENVECTOR RANKS

(71) Applicant: HRL Laboratories, LLC, Malibu, CA (US)

(72) Inventor: Hankyu Moon, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/795,230

(22) Filed: Oct. 26, 2017

Related U.S. Application Data

(63) Continuation-in-part of application No. 14/638,966, filed on Mar. 4, 2015, now abandoned.
(Continued)

(51) Int. Cl.
*G06F 17/16* (2006.01)
*G06F 17/00* (2019.01)
(Continued)

(52) U.S. Cl.
CPC ........ *G06F 16/337* (2019.01); *G06F 16/3346* (2019.01); *G06F 16/35* (2019.01); *G06F 17/16* (2013.01); *G06N 20/00* (2019.01)

(58) Field of Classification Search
CPC .... G06F 17/27; G06F 17/2705; G06F 17/271; G06F 17/2715; G06F 17/2725;
(Continued)

(56) References Cited

U.S. PATENT DOCUMENTS

| | | | | |
|---|---|---|---|---|
| 5,210,689 A | * | 5/1993 | Baker | G06F 3/0489 341/22 |
| 2004/0177179 A1 | * | 9/2004 | Koivuniemi | G06F 3/0237 710/67 |

(Continued)

FOREIGN PATENT DOCUMENTS

EP 0628947 A1 * 12/1994 ........... G10L 19/012

OTHER PUBLICATIONS

Bollen, J., Mao, H., & Zeng, X. (2011). Twitter mood predicts the stock market. Journal of Computational Science, 2(1), pp. 1-8.
(Continued)

*Primary Examiner* — Dwayne D Bost
*Assistant Examiner* — Stephen M Brinich
(74) *Attorney, Agent, or Firm* — Tope-McKay & Associates (57) ABSTRACT

Described is a system for identifying predictive keywords and generating a forecast. The system receives time-series of keyword counts (the time-series of keyword counts having a plurality of candidate keywords). The time-series of keyword counts are separated (i.e., marked or designated) into a group of time-series from active periods and a group of time-series from inactive periods. A covariance matrix is generated for each group of time-series. Generalized eigenvectors are generated between the two covariance matrices. Candidate keywords are ranked based on the generalized eigenvectors, such that candidate keywords having a rank exceeding a predetermined threshold are designated as predictive keywords. The predictive keywords are then provided to a machine learning system that generates a forecast based on the predictive keywords. Finally, a device is operated based on the forecast.

12 Claims, 8 Drawing Sheets

Related U.S. Application Data (60) Provisional application No. 61/948,372, filed on Mar. 5, 2014.

(51) Int. Cl.
    *G06F 16/335*     (2019.01)
    *G06N 20/00*     (2019.01)
    *G06F 16/35*     (2019.01)
    *G06F 16/33*     (2019.01)

(58) Field of Classification Search
CPC ............. G06F 17/2735; G06F 17/3002; G06F 17/30038; G06F 17/30268; G06F 17/30752; G06F 17/3082; G06F 17/3053; G06F 17/30707; G06F 17/30864; G06F 17/18; G06F 17/5018; G06F 2217/16; G06F 17/13

USPC .................... 704/1–10, 235, 263, 266; 703/2
See application file for complete search history.

(56) References Cited

U.S. PATENT DOCUMENTS

2006/0217144 A1* 9/2006 Bonnelykke Kristensen .............. G06F 3/0233 455/550.1

2013/0104068 A1* 4/2013 Murphy ................ G06F 3/0237 715/773

OTHER PUBLICATIONS

Choi, H., & Varian, H. (2012). Predicting the present with google trends. Economic Record, 88(s1), pp. 2-9.

Goel, S., Hofman, J. M., Lahaie, S., Pennock, D. M., & Watts, D. J. (2010). Predicting consumer behavior with Web search. Proceedings of the National Academy of Sciences, 107(41), pp. 17486-17490.

Kubek, M., & Unger, H. (2011). Topic Detection Based on the PageRank's Clustering Property. In IICS, pp. 139-148.

Lotan, G., Graeff, E., Ananny, M., Gaffney, D., Pearce, L, & Boyd, D. (2011). The revolutions were tweeted: Information flows during the 2011 Tunisian and Egyptian revolutions. International Journal of Communication, 5, pp. 1375-1405.

Malayath, N., Hermansky, H., Kain, A., & Carlson, R. (1997). Speaker-independent feature extraction by oriented principal component analysis. In Proc. of the European Conference on Speech Communication and Technology, Rhodes (Greece), pp. 1-4.

Nadakuditi, R. R., & Silverstein, J. W. (2010). Fundamental limit of sample generalized eigenvalue based detection of signals in noise using relatively few signal-bearing and noise-only samples. Selected Topics in Signal Processing, IEEE Journal of, 4(3), pp. 468-480.

Page, L., Brin, S., Motwani, R., & Winograd, T. (1999). The PageRank citation ranking: bringing order to the web, pp. 1-17.

Thelen, M., & Riloff, E. (Jul. 2002). A bootstrapping method for learning semantic lexicons using extraction pattern contexts. In Proceedings of the ACL-02 conference on Empirical methods in natural language processing-vol. 10, pp. 214-221. Association for Computational Linguistics.

Tumasjan, A., Sprenger, T. O., Sandner, P. G., & Welpe, I. M. (2010). Predicting Elections with Twitter: What 140 Characters Reveal about Political Sentiment. ICWSM, 10, pp. 178-185.

\* cited by examiner

FIG. 3 telecast, national, #national, idiots, win, free, hope, goey,, violence, end, system, guts, arrived, lady, remember, shame, end, win, ricardo, chelsea, ignorance, area, track, japan, exit, made, ignorant, cheating, spread, rumors, reports, congratulations, stone, average, lennon, won, pan, spend, mancera, started, scientific, full, offspring, dress, shame, this country, dinosaur, wanted, therapy, walls, federal, lie, tolerance, soap, mirrey, other, guzman, quintana, ignorant, satisfied, fam, are, accept, deserve, return, economic, is, report, missing, deserve, next, quintana roo, attached, bought, means, movement, loser, chronic, active, gift, we, miserable, eat, our, surrender, assault, trail, leonardo, called, night, pompadour, chingan, scene, reporting, stop, start, gel, topic, count, you hurt, public, graph, ulysses, recognize, position, pantry, legs, victory, angelice, just, grenade, #grenade, back, Hakuna, matata, sheet, expired, wrong, absolute, valdés, fight, factory, opposition, capture, losing, change, records, corruption, mall, sticks, ponganse, stable, fucking, sec, addict, cuchi, trending, topic, silent, honest, machete, violent, irresponsible, statistics, sad, johnson, equity, bibi, last, claim, forward, democratic, better, selected, claim, vote, mocking, eagle, paid, complain, concerned, disappointment, trusted, talk, percent, get, work, require, server, pay, shot, forward, clean, experts, manifest, watch, specify, count, margin, defeated, anger, granite, show, wake up, believe, total, today more, fast, rule, upset, assault

FIG. 4A i, i, #i, is, so, love, #love, says, sleep, sleep ..., #sleep, you, you, ay, strange, haha, talk, also, see, see, face, men, song, hurt, ando, exit, party, #party, good, #good, cute, cute, luck, #fate, say, sii, never, things, talking, dream, i, idea, cold, front, song, way, start, luis, look, #omg, joke, that good, forget, omg, to, want, follow back, then, see, fall, this, come, how many, few, nice, #nice, love, fashion, #fashion, gets, event, small, remember, could, #pic, pic, dude, er, tell, which, single, children, there's, literally, #literal, forget, start, what's, friends, which, throw, jenny, hard, breast, character, trick is, vip, clean, mother, million, wrong, whatever, princeso, both, #peopleschoice, no good, limit, bank, benedict, superbowl, #superbowl, maroon, took, xvi, your mistakes, ahhhhh, stream, reference, can mean, goal, wins #followers, grow, loser, you, play, food, #dinner, old lady, size, dip, brought, obese, fine, love (8, compare, never, say, blow, sent, would go, jajajajaaj, jejejej, mommy, missed, #mientocomohombre, horn, vergara, stuff, pass, workout, #workout, use, berrinchudas, shrimp, coachella, babies, sticky, prove, dating, was, sooooooooo, y, dies, beyoncé, beginning, ema, recent, enjoy, ajaj, valentines, love her, susana, cuban, followed, usual, waiting, renata, city district, crazy, report back, #amigosquevalenoro, life would be, jjajajajaja, today, daughter, ham, deny, melt, jure, opened, flat, haste, fuistes, waltz, requires, uady, data, used, token, gate, love, porn, eddie, dummy, #yenpocaspalabras, sick, bored, domain, mansion, pond, embrace, should, experience, cheerful, bows, liliana, approach, asado, relaxed, muaa, got, lindoo, coc\ Hi, qede, people, protect, little minutes, #elproblemanoes, dana, did, colon, felicitas, dangerous, my good, field

SYSTEM AND METHOD FOR IDENTIFYING PREDICTIVE KEYWORDS BASED ON GENERALIZED EIGENVECTOR RANKS

CROSS-REFERENCE TO RELATED APPLICATIONS

The present application is a Continuation-in-Part application of U.S. Nonprovisional application Ser. No. 14/638,966, filed on Mar. 4, 2015, which is a nonprovisional patent application of U.S. Provisional Application No. 61/948,372, filed on Mar. 5, 2014, the entirety of which are incorporated herein by reference.

GOVERNMENT RIGHTS

This invention was made with government support under U.S. Government Contract Number D12PC00285 OSI—Open Source Indicators. The government has certain rights in the invention.

BACKGROUND OF INVENTION

(1) Field of Invention

The present invention is relates to a prediction system and, more specifically, to a system for identifying predictive keywords from text data streams and using those keywords to predict trends and events in a population.

(2) Description of Related Art

Recent availability of social media and other publically accessible internet-based data enables the measurements for understanding what is in people's minds. Computational approaches are being developed to take advantage of utilizing live streams of public expressions to understand the public minds and find interesting changes or trends, for example, changes in public sentiments or opinions. Most of the current approaches process large amount of text data and find specific terms that have relevance to the topics of interest. The frequency of these terms signifies the degree of public interest or attention toward the related topics. The terms are typically selected ad hoc based on expert knowledge and are empirically tested for their utilities.

By way of example, there have been many methods to identify consumer trends (see the List of Incorporated References, Literature Reference Nos. 2 and 3), financial market trends (see Literature Reference No. 1), social unrest (see Literature Reference No. 5), or political landscape (see Literature Reference No. 10), by analyzing social media content or web search volumes. Heavy usage of these keywords/hashtags in social media or high volumes of search activities for these keywords represent public interests or sentiments toward certain topics related to these keywords. All of these methods depend on the choice of terms or Twitter hashtags determined by domain knowledge, and do not utilize any automated means to identify those key features. Existing approaches to extract new terms pertaining to specific topics include the natural language processing (NLP) based method (see Literature Reference No. 9) and the word clustering based method (see Literature Reference No. 4).

There have been approaches in signal processing to extract discriminative features (see Literature Reference Nos. 6 and 7) based on variances of samples in a supervised way. These methods find the direction that maximizes the variance among the positive samples while minimizing the variance among the negative samples. The direction is computed using the first generalized eigenvector between the two sample covariance matrices. On the other hand, network centrality algorithms such as that described in Literature Reference No. 8 have been developed to identify important nodes in a network of related entities. Such a method finds the most influential nodes in the network of internet homepages based on the ranks computed from the first eigenvector of the network matrix. Such processes still require domain knowledge and do not adapt easily to changes.

As noted above, current approaches to understanding population trends depend heavily on the selection of domain terms identified based on expert knowledge. However, such approaches are fundamentally limited because: (1) it is hard to have a full knowledge about topics that often depend on locales; and (2) the term usage may also change over time. Thus, a continuing need exists for a system for predicting population trends and events from social media streams without domain knowledge about the subject topics.

SUMMARY OF INVENTION

Described is a system for identifying predictive keywords. In one aspect, the system includes one or more processors and a memory, the memory being a non-transitory computer-readable medium having executable instructions encoded thereon, such that upon execution of the instructions, the one or more processors perform several operations, including: receiving time-series of keyword counts, the time-series of keyword counts having a plurality of candidate keywords; separating the time-series of keyword counts into a group of time-series from active periods and a group of time-series from inactive periods; generating a first covariance matrix for the group of time-series from active periods and a second covariance matrix for the group of time-series from inactive periods; generating generalized eigenvectors between the two covariance matrices; ranking the candidate keywords based on the generalized eigenvectors, such that candidate keywords having a rank exceeding a predetermined threshold are designated as predictive keywords; and providing the predictive keywords to a machine learning system that generates a forecast based on the predictive keywords; and operating a device based on the forecast.

In another aspect, operating the device comprises pushing advertisements to a user's social media account via a network.

In yet another aspect, operating the device further comprises generating and transmitting an alert regarding the forecast.

In another aspect, the generalized eigenvectors $\{v_1, v_2, \ldots, v_n\}$ between the first covariance matrix $Cov(X_a)$ and the second covariance matrix $Cov(X_i)$ are the n-dimensional vectors $v$ that satisfies: $Cov(X_a)v = \lambda \cdot Cov(X_i)v$, where $\lambda$ is a scalar, which is a generalized eigenvalue.

In yet another aspect, in ranking the candidate keywords, a first generalized eigenvector $v_1$ that corresponds to a largest generalized eigenvalue $\lambda_1$ is used to rank the candidate keywords, such that if $v_1 = \{v_{11}, v_{12}, \ldots, v_{1n}\}$, then the $i^{th}$ component $v_{1i}$ represents a strength of the $i^{th}$ candidate keyword $w_i$, with the candidate keywords being ranked according to their eigenvector ranking, as follows: $w'_n < w'_{n-1} < \ldots < w'_1$.

Additionally and in another aspect, the time-series of keyword counts are retrieved from social media text.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4A is a list of high-ranking terms based on generalized eigenvector ranks;

FIG. 4B is a list of low-ranking terms based on the generalized eigenvector ranks;

DETAILED DESCRIPTION

The present invention is relates to a prediction system and, more specifically, to a system for identifying predictive keywords from text data streams and using those keywords to predict trends and events in a population. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Bollen, J., Mao, H., & Zeng, X. (2011). Twitter mood predicts the stock market. *Journal of Computational Science,* 2(1), 1-8.
2. Choi, H., & Varian, H. (2012). Predicting the present with google trends. *Economic Record,* 88(s1), 2-9.
3. Goel, S., Hofman, J. M., Lahaie, S., Pennock, D. M., & Watts, D. J. (2010). Predicting consumer behavior with Web search. *Proceedings of the National Academy of Sciences,* 107(41), 17486-174-90. (see for examples narrow topic terms).
4. Kubek, M., & Unger, H. (2011). Topic Detection Based on the PageRank's Clustering Property. In *IICS* (pp. 139-148). (see for an example of term clustering based on page rank over network of terms).
5. Lotan, G., Graeff, E., Ananny, M., Gaffney, D., Pearce, I., & Boyd, D. (2011) The revolutions were tweeted: Information flows during the 2011 Tunisian and Egyptian revolutions. *International Journal of Communication,* 5, 1375-1405. (see for examples of chosen terms).
6. Malayath, N., Hermansky, H., Kain, A., & Carlson, R. (1997). Speaker-independent feature extraction by oriented principal component analysis. In *Proc. of the European Conference on Speech Communication and Technology, Rhodes (Greece).*
7. Nadakuditi, R. R., & Silverstein, J. W. (2010). Fundamental limit of sample generalized eigenvalue based detection of signals in noise using relatively few signal-bearing and noise-only samples. *Selected Topics in Signal Processing, IEEE Journal of* 4(3), 468-480.

8. Page, L., Brin, S., Motwani, R., & Winograd, T. (1999). The PageRank citation ranking: bringing order to the web. (see for an example of network based ranking).
9. Thelen, M., & Riloff, E. (2002, July). A bootstrapping method for learning semantic lexicons using extraction pattern contexts. In *Proceedings of the ACL*-02 *conference on Empirical methods in natural language processing-Volume* 10 (pp. 214-221). Association for Computational Linguistics. (see for an example of NLP based term identification).
9. Tumasjan, A., Sprenger, T. O., Sandner, P. G., & Welpe, I. M. (2010). Predicting Elections with Twitter: What 140 Characters Reveal about Political Sentiment. *ICWSM*, 10, 178-185. (see for examples of professionally identified emotion terms).

(2) Principal Aspects

The present invention has three "principal" aspects. The first is a system for identifying predictive keywords. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
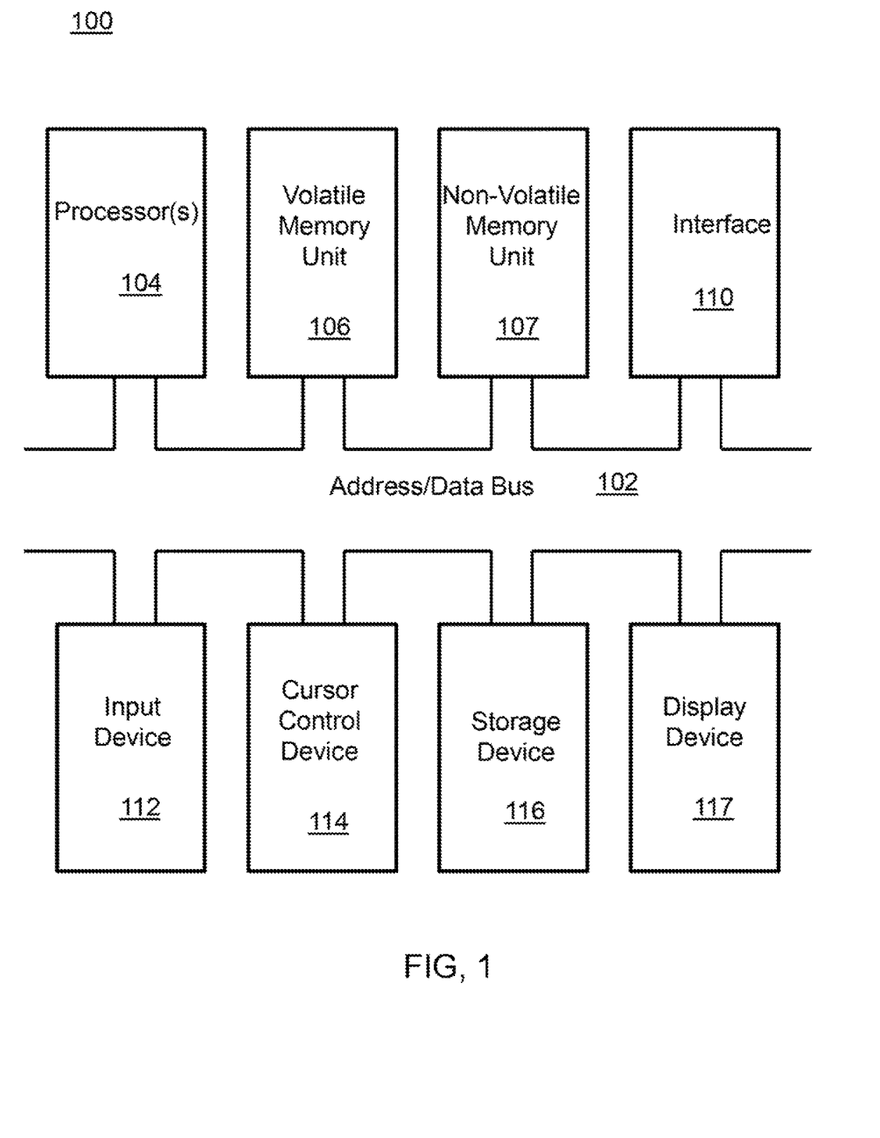
FIG. 1 is a block diagram depicting the components of a system according to the principles of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
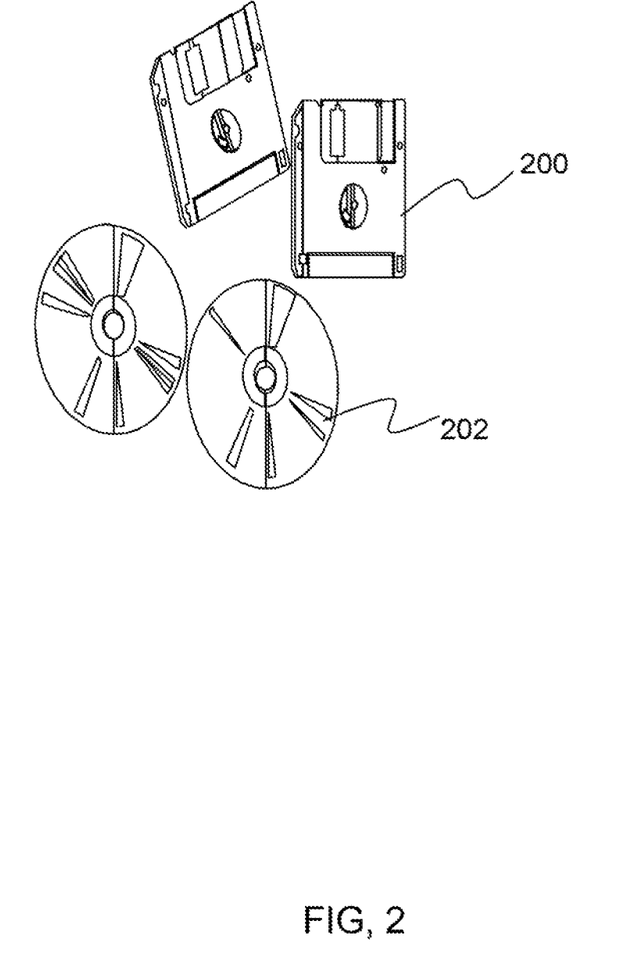
FIG. 2 is an illustration of a computer program product embodying an aspect of the present invention.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Described is a system and method for identifying predictive keywords. The system serves to identify terms that the public uses in social media that are predictive of population level events or trends (such as civil unrest, market events, or consumer trends, etc.) for the purpose of forecasting these trends or events. The system provides an automated approach that discovers novel keywords related to given topics purely from the bottom-up using social media texts (such as Tweets™); as to be contrasted with the prior art that provides top-down selection based on domain knowledge. The technique according to the principles of the present invention is based on generalized eigenvector ranking of term correlations. The correlation strength between two terms is the linear correlation between the time-series of the frequency counts of the terms in a social media stream (e.g., Tweet™ stream). It is assumed that: (1) co-trending terms with high-frequency correlation belong to the same topic; and (2) the dominance of the terms can be measured by the generalized eigenvector centrality. In testing, it was shown the system is capable of automatically finding terms that are specific to locales, periods, and topics without expert knowledge, and of predicting trends and events in population. Importantly, it was verified that the newly discovered terms achieve the same prediction performance level as the expert terms, and the addition of the new terms to domain knowledge based terms show improvement of the prediction performance over the domain knowledge based terms. Thus, using the system described herein provides a considerable improvement over the state of the art in prediction systems.

The system is well suited for detecting and forecasting trends or events in population. For example, the system and corresponding method can be applied to predicting societal events (such as protests, strikes, riots, etc.), consumer trends, or economic events, to provide information benefitting government agencies and commercial entities. Specific aspects regarding the invention are provided in further detail below.

(4) Specific Aspects of the Invention

As noted above and as shown in FIG. 3, described is a system and method for identifying novel predictive keywords 300. The system receives as an input a time-series of keyword counts 302, which are designated/separated 303 into active 304 and inactive 306 periods according to the ground truth event/trend data 305. These separated time-series are used to individually compute covariance matrices 308. It should be noted that in separating the time-series, the time-series are not being split up. Rather, the system receives a time-series (for example, a daily count from 2012-2013) and then specific periods are designated or marked as active/inactive. Thus, for example, January 10-13 might be marked as active, January 14-20 might be marked as inactive, January 21-30 might be marked as active, etc.

Figure 3:
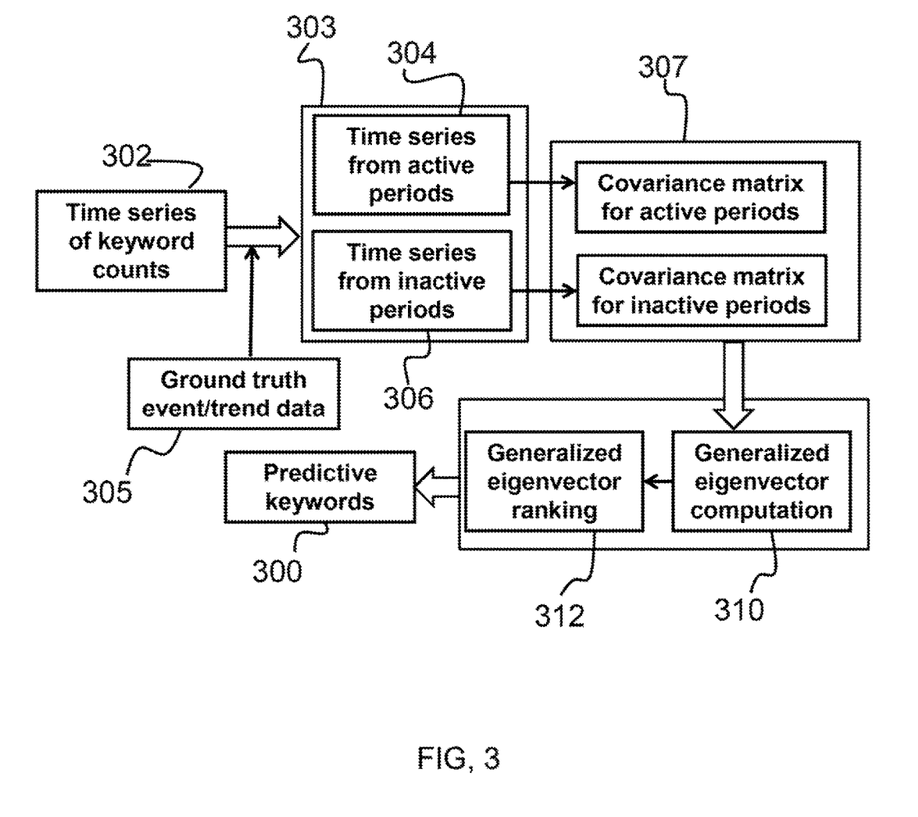
FIG. 3 is a flow chart illustrating a process for identifying predictive keywords accordingly to the principles of the present invention.

Then, the first generalized eigenvector 310 computed between these two matrices provides ranks 312 to the candidate terms for their relevance to the given events or trends of interest. Those candidate terms that have ranks 312 exceeding a predetermined threshold are determined to be novel predictive keywords 300. Each of these steps are described in further detail below.

(4.1) Input Time-Series

As noted above, the system receives input data as a time-series of keyword counts from social media. It should be noted that the data can be captured from any social media system, a non-limiting example of which includes Twitter and its corresponding Tweets™ or Tweet™ texts. The initial candidate keywords include a large number of words from a dictionary or words from social media texts. For example, if an operator knew she was dealing with English text, the system could implement an English dictionary or a list of commonly used words (e.g., 25,000 Spanish terms as noted below). Alternatively, the system could simply sample data from the data stream and use terms above a given threshold. A goal is to include a large set of potential terms and then, for each term, compute its time-series for input (i.e., time-series of keyword counts 302) into the system.

An example study was performed that focused on civil unrest activities in Mexico, with Spanish Tweets™ texts as originated from Mexico as measurements. The time series X for computing the term correlation network were extracted from the Tweets™ that originated from five states in Mexico (Chiapas, Guanajuato, Jalisco, Morelos, and Puebla). It should be noted that although any suitable number of texts can be used, the number is desirably large enough to provide a predictive value regarding an event (trend, etc.). In this study, for example, 25,000 Spanish terms from Tweet™ texts were selected for ranking their relevance to civil unrest. Thus, in this example, $w=\{w_1, w_2, \ldots, w_{25000}\}$ are candidate keywords.

In essence, the system obtains a generic source dictionary, partitions the received texts (e.g., Tweets™) into those from a period of unrest and a period of peace, operate on the source dictionary to generate a smaller more focused dictionary that improve the ability to predict events of civil unrest. Processing the source dictionary into a smaller subset reduces memory requirements and improves the ability to predict social unrest.

(4.2) Separation of Time-Series

The method according to the principles of the present invention assumes that ground truth data about population events or trends are available. For events data, ground truth data for events such as protests, strikes, or market crash, are collected from sources such as news. For trends data, ground truth data for public opinions can be collected from published resources such as a survey, a poll, or market share numbers. The event ground truth data separates the time-series into the 'active periods' that are periods shortly before events, and the 'inactive periods' that are periods outside of the active periods. The trends ground data will separate the time series into the 'high periods' when the trend shows high popularity (of candidate, product, etc.) and into the 'low periods' when the trend shows average or low popularity.

In the example study, the Tweet™ keyword time series X were collected from May 2012 to March 2013, and were separated into inactive periods and active civil unrest periods according to the ground truth events data. A certain fixed number of days (for example, between 1 to 3 days) before the ground truth events (strikes, protests, etc.) belong to the active periods. Other dates belong to inactive periods. If the ground truth events are limited to certain locale, period, or issues (for example, labor versus environmental) then the resulting keywords will be specific to the locale, periods, or issues.

(4.3) Computation of Covariance Matrices

Each of the two sets of separated time series data (active and inactive) are used to compute covariance matrices. For the active period time series $X_a$, the covariance matrix is:

$$Cov(X_a) = \left(\frac{X_a - m(X_a)}{\sigma(X_a)}\right)\left(\frac{X_a - m(X_a)}{\sigma(X_a)}\right)^T.$$

Here, $m(.)$ is the arithmetic mean, $\sigma(.)$ is the standard deviation, and T is the vector transpose.

The covariance matrix for the inactive time series $X_i$ is:

$$Cov(X_i) = \left(\frac{X_i - m(X_i)}{\sigma(X_i)}\right)\left(\frac{X_i - m(X_i)}{\sigma(X_i)}\right)^T.$$

When the number of candidate terms is n, the dimensionality of both $X_a$ and $X_i$ will be n, and the dimensionality of both $Cov(X_a)$ and $Cov(X_i)$ will be n×n.

An alternative way to produce the covariance matrices from X is to first compute its derivatives before computing the matrices. That is, first compute the derivative $dX_t = X_t - X_{t-d}$, split the derivative time series into active and inactive periods in the same way as above, and compute the covariance matrices. The amount of delay d can be chosen that best capture the time scale of the trends.

(4.4) Computation of Generalized Eigenvectors and Ranking of Keywords based on the First Generalized Eigenvector Component The generalized eigenvectors $\{v_1, v_2, \ldots, v_n\}$ between $Cov(X_a)$ and $Cov(X_i)$ are the n-dimensional vectors v that satisfies:

$$Cov(X_a)v = \lambda \cdot Cov(X_i)v.$$

Here, $\lambda$ is a scalar, which is the generalized eigenvalue. The first generalized eigenvector $v_1$ that corresponds to the largest generalized eigenvalue $\lambda_1$ is used to rank the keywords.

If $v_1 = \{v_{11}, v_{12}, \ldots, v_{1n}\}$, then the $i^{th}$ component $v_{1i}$ represents the strength of the $i^{th}$ keyword $w_i$. Thus, if it is assumed that the keywords are ordered according to the eigenvector ranking $w'_n < w'_{n-1} < \ldots < w'_1$, then the top keywords (e.g., top 30 keywords or any other predetermined number) are $w'_1, w'_2, \ldots, w'_{30}$.

FIG. 4A shows the top ranked terms in the example study, based on the generalized eigenvector rank. The rank in this example signifies the relevance of the terms to civil unrest. The list provides high-rank terms of which, as shown, the vast majority are related to civil unrest. They include violence/crime terms, social terms, names of public figures, and curse words. The terms are machine translated to English, and more explicitly civil unrest related terms are marked as underlined text.

It should be noted that there are many election related terms, such as vote, victory, win, and count, reflecting the heightened civil unrest activity in Mexico caused by a presidential election in the past year. There are also many action related terms such as 'end', 'stop', 'spread', 'forward', 'wake up', etc. and violence related terms such as 'fight', 'assault', 'shot', 'stone', 'stick', etc. The method identified other interesting terms: 'goey' (slang word for inhaling glue), 'Guzman' (the notorious Mexican drug lord), and some curse words. These terms as identified bottom-up from the input data may contribute to detecting civil unrest in general and are designated as predictive keywords. Moreover, they can potentially detect civil unrests that are otherwise hard to detect using general domain terms—that is, the events that are either transient (e.g., election related) or locale specific (e.g., names of local politicians). Alternatively, FIG. 4B provides a list of low-ranking terms, which happen to be mostly mundane terms and everyday expressions, such as 'love', 'sleep', 'face', 'party', 'cute', etc.

In operation, the system will rank all of the inputs (e.g., 25,000 Spanish terms). FIG. 4A shows a sampling of those terms of which the system ranked high, while FIG. 4B shows a sampling of those which it ranked low. Those which were ranked high are potential new features whereas those ranked low are not likely of interest.

(4.5) Example Predictive Model based on the novel Predictive Keywords

The newly identified predictive keywords can be utilized to predict real world events, such civil unrest events, using machine learning methods. Non-limiting examples of such machine learning methods include Ada Boost, Logistic Regression, support vector machine (SVM), and Decision Tree (collectively referred to as ML4). The keyword counts time-series from, for example, Tweets™ are inputs to the machine learning methods.

In an example implementation, testing was performed on eleven Mexican states over the period of April-May 2013, which is a period that does not overlap with the 'training' period for identifying the terms (as detailed above). The keyword counts time-series from Tweets™ are inputs to the various machine learning methods and systems using such methods, such as SVM, logistic regression, AdaBoost, or decision tree. A subset of the time-series may serve as training examples for the machine learning methods, and the rest of the time-series may serve as testing examples. Two different implementations were tested to compare the effectiveness of the newly discovered predictive keywords. The first implementation builds a predictive model based on the new predictive keywords, and compares its predictive performance to the performance of the expert knowledge based terms. The second implementation builds a predictive model with the new keywords combined with the expert knowledge based keywords to verify the performance improvement over the expert knowledge based keywords.

(4.5.1) Test One: Civil Unrest Model Based on New Predictive Keywords

Figure 5A:
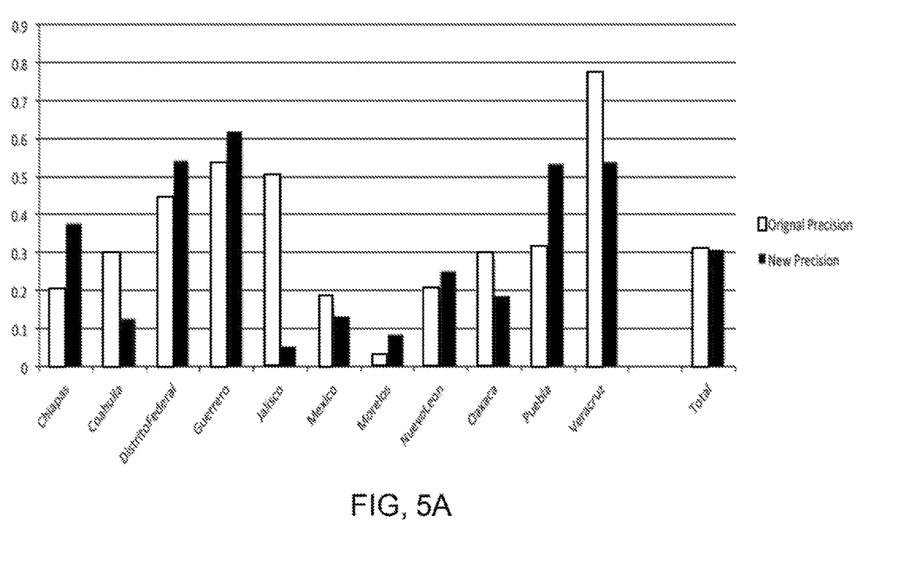
FIG. 5A is a bar graph illustrating precision score comparisons for 31 original features versus 43 new features over states in Mexico given a fixed recall.
Figure 5B:
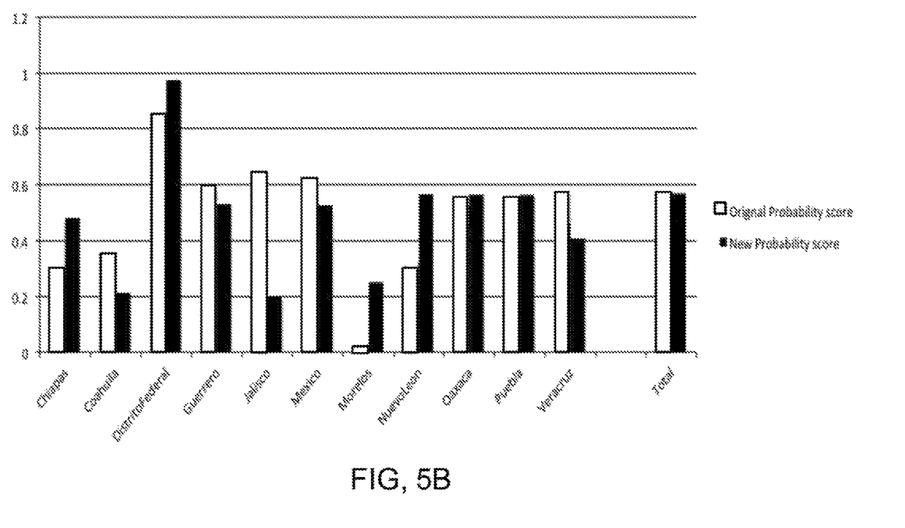
FIG. 5B is a bar graph illustrating probability score comparisons for 31 original features versus 43 new features over states in Mexico given a fixed recall.

A first test was performed to verify whether the civil unrest model based on the new predictive keywords can achieve the same level of performance as a model that utilizes knowledge-based civil unrest terms. More specifically, the reference model is the learning machine trained with the input Tweet™ count time-series of 31 civil unrest terms as identified by domain experts. The test model was the learning machine with the Tweet™ count time-series of the 43 new predictive keywords as automatically identified according to the principles of the present invention. For an easier comparison, thresholds were selected for prediction (per state) to have a fixed recall score of 50% (or close to it when 50% cannot be achieved). Then, both the precision and probability scores were computed for the detected events at the threshold. FIG. 5A is a bar graph illustrating precision score plots while FIG. 5B is a bar graph illustrating probability score plots. The bar graphs compare the 31 expert terms against the new 43 predictive keywords across 11 states in Mexico given a fixed recall of approximately 50%. The newly identified features (i.e., predictive keywords) achieved precision scores comparable to the original features, showing improvement in 6 states and degradation in 5 states. The overall precision degradation was minimal, going from 31.5% to 30.7%. As shown in FIG. 5B, the new features (i.e., predictive keywords) achieved probability scores comparable to the original features, showing improvement in 6 states and degradation in 5 states. The overall probability degradation was minimal, going from 0.58 to 0.57. Thus, the test demonstrated that the system according to the principles of the present invention can quickly construct a civil unrest forecast model for other countries/languages without any domain expert help, as long as ground truth event data and social media feed (such as Twitter) are available.

(4.5.2) Test Two: Civil Unrest Model Based on the New Predictive Keywords

Another test was performed to verify whether the new predictive keywords could help an existing domain knowledge-based model to improve its performance. Again, the reference model was machine learning with the four learning methods (i.e., ML4) with the input Tweet™ count time-series of the 31 knowledge-based domain terms. The test model was the ML4 with the time-series of the 31 existing terms and 43 new predictive keywords. For consistency, thresholds were set for prediction at a fixed recall score of 50%.

Figure 6A:
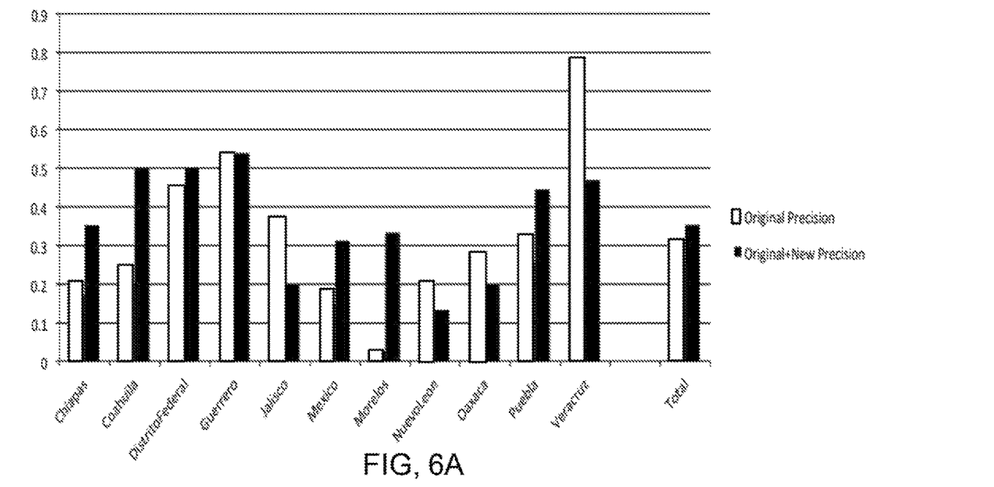
FIG. 6A is a bar graph illustrating precision score comparisons for 31 original features versus 31 plus 43 new features over states in Mexico given a fixed recall.
Figure 6B:
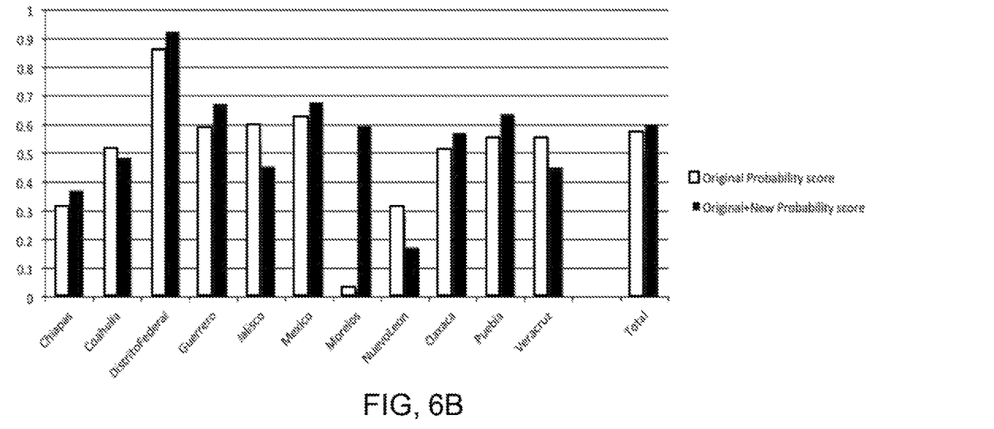
FIG. 6B is a bar graph illustrating probability score comparisons for 31 original features versus 31 plus 43 new features over states in Mexico given a fixed recall.

FIG. 6A is a bar graph illustrating precision score plots while FIG. 6B is a bar graph illustrating probability score plots. The bar graphs compare the 31 expert original terms against the 31 original terms plus the 43 predictive keywords. The newly identified features improved precision for 6 out of 11 states in Mexico, with total improvement of 31.8% to 35.4% (4 states showed degradation, 1 state exhibited no change). The new features improved probability score for 7 out of 11 states in Mexico, with total improvement of 0.58 to 0.6 (4 states showed degradation).

Therefore and as demonstrated, performance of existing machine learning predictive systems can be improved by adding automatically identified novel features (i.e., predictive keywords). Alternatively, if expert domain-knowledge is not available, the principles of the present invention can be employed to automatically generate predictive keywords that perform as well as those as generated by experts.

(4.6) Example Implementations

As can be appreciated by those skilled in the art, a number of operations and/or actions can be initiated and executed based on the predictive keywords and forecast through operating one or more devices. For example, operating the device based on the forecast includes pushing advertisements to a user's social media account via a network or, in another example, includes generating and transmitting an alert regarding the forecast to an account administrator. Further details are provided below.

As a non-limiting example, the system can be used for advertising purposes to predict consumer trends and send out online advertisements and/or alerts based on those trends. For example, the system can be used to provide enhanced services, such as personalization and recommendations regarding a particular product or service based on the forecast generated using the predictive keywords. For example, the system may identify predictive keywords from various social media user accounts that are associated with a consumer trend such as increasing interest or purchases of a particular product or group of products. Through use of the identified predictive keywords for a particular consumer trend, the system can then provide a better forecast of additional users' interest in the trend by identifying and looking at the social media users' use of the predictive keywords that were identified by the system. If, for example, a social media account uses the already identified predictive keywords related to a particular product or service or trend, then the system can determine that the user has a high interest in a particular product or service and, based on that, push advertisements to the social media user account that correspond to that product or service. In another example, if it is forecast that use of a predictive keyword is indicative of a particular social media user's interest in a particular product or service, then the advertisements can be pushed to the social media user's account. In this way, advertisements that may not otherwise be directed to a particular social media account based on the activities on that social network could be delivered to that particular social media account based on the social media user account's use of the system identified predictive keywords and corresponding forecast.

As another example of operating a device, the system could use a display, or transmit information via a network card or wireless receiver or network, or transmit information regarding the forecast and/or predictive keywords using any other suitable mechanism or technique as understood by those skilled in the art. As another example, the device operation includes outputting the forecast, user accounts and/or predictive keywords via at least one of a display and a network transmission Also as noted above, the system can be used for security or other purposes. For example, if a particular forecast relates to civil unrest or desired or undesired events or trends, the system can be configured to generate and transmit an alert of the forecast (e.g., via e-mail, text, etc.), such as to notify police, account admins, or other interested persons, via a display, website, social media account, a message from a server to a client, and/or one or more messages sent via text message or email to a recipient or interested part.

Figure 7:
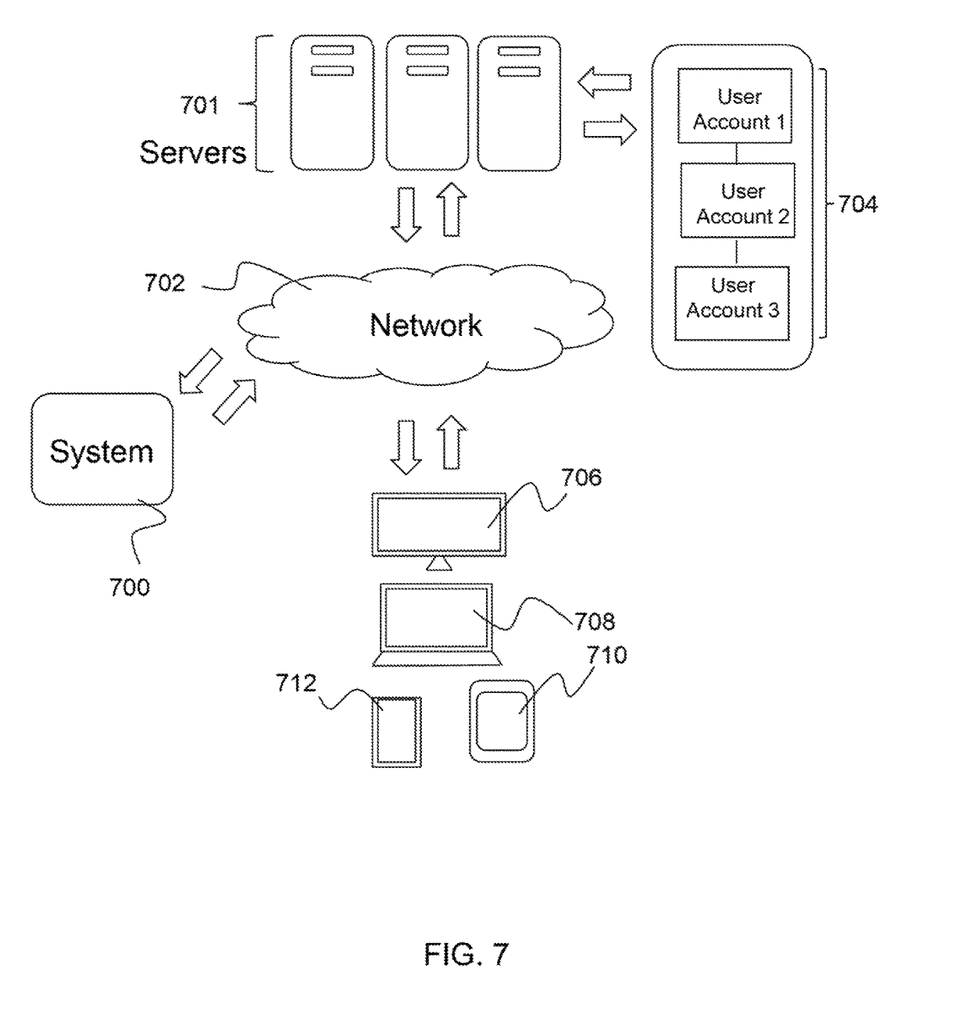
FIG. 7 is an illustration of hardware communications in the system according to some embodiments of the present disclosure.

As shown in FIG. 7, the system 700 according to embodiments of the present disclosure connects with servers 701 for social network platforms to access information or automatically provide targeted advertisements to a display screen on a communication device (elements, 706, 708, 710, 710) via a social network account (element 704). The system 700 connects via a network 702 to servers 701 to send and receive information relating to various social media network of interconnected user accounts (element 704) that are accessed via mobile and non-mobile devices, non-limiting examples of which include desktops 706, laptops 707, iPhone 710, Android, and other mobile devices 712. Non-limiting examples of user accounts (element 704) include Facebook® user accounts and Twitter® user accounts. As can be appreciated by one skilled in the art, the user device is any device that can receive and transmit data via the network 702. Additionally, a user account may be a user account of a social media platform, which may or may not be capable of receiving targeted marketing.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for identifying predictive keywords and advertising based on the predictive keywords, the system comprising:
    one or more processors and a memory, the memory being a non-transitory computer-readable medium having executable instructions encoded thereon, such that upon execution of the instructions, the one or more processors perform operations of:
        receiving time-series of keyword counts, the time-series of keyword counts having a plurality of candidate keywords;
        separating the time-series of keyword counts into a group of time-series from active periods and a group of time-series from inactive periods;
        generating a first covariance matrix for the group of time-series from active periods and a second covariance matrix for the group of time-series from inactive periods;
        generating generalized eigenvectors between the two covariance matrices;
        ranking the candidate keywords based on the generalized eigenvectors, such that candidate keywords having a rank exceeding a predetermined threshold are designated as predictive keywords;
        providing the predictive keywords to a machine learning system that generates a forecast regarding a particular product based on the predictive keywords; and
        causing a server for a social network platform to push an advertisement associated with the particular product for display on a social media user's account.

2. The system as set forth in claim 1, wherein the generalized eigenvectors $\{v_1, v_2, \ldots, v_n\}$ between the first covariance matrix $Cov(X_a)$ and the second covariance matrix $Cov(X_i)$ are the n-dimensional vectors v that satisfies:

$$Cov(X_a)v = \lambda \cdot Cov(X_i)v,$$

where $\lambda$ is a scalar, which is a generalized eigenvalue.

3. The system as set forth in claim 2, wherein in ranking the candidate keywords, a first generalized eigenvector $v_1$ that corresponds to a largest generalized eigenvalue $\lambda_1$ is used to rank the candidate keywords, such that if $v_1 = \{v_{11}, v_{12}, \ldots, v_{1n}\}$, then the $i^{th}$ component $v_{1i}$ represents a strength of the $i^{th}$ candidate keyword $w_i$, with the candidate keywords being ranked according to their eigenvector ranking, as follows: $w'_n < w'_{n-1} < \ldots < w'_1$.

4. The system as set forth in claim 3, wherein the time-series of keyword counts are retrieved from social media text.

5. A method for identifying predictive keywords and advertising based on the predictive keywords, the method comprising an act of:
    executing instructions encoded on a non-transitory computer readable medium, such that upon execution, one or more processors perform operations of:
        receiving time-series of keyword counts, the time-series of keyword counts having a plurality of candidate keywords;
        separating the time-series of keyword counts into a group of time-series from active periods and a group of time-series from inactive periods;
        generating a first covariance matrix for the group of time-series from active periods and a second covariance matrix for the group of time-series from inactive periods;
        generating generalized eigenvectors between the two covariance matrices;
        ranking the candidate keywords based on the generalized eigenvectors, such that candidate keywords having a rank exceeding a predetermined threshold are designated as predictive keywords;
        providing the predictive keywords to a machine learning system that generates a forecast regarding a particular product based on the predictive keywords; and
        causing a server for a social network platform to push an advertisement associated with the particular product for display on a social media user's account.

6. The method as set forth in claim 5, wherein the generalized eigenvectors $\{v_1, v_2, \ldots, v_n\}$ between the first covariance matrix $Cov(X_a)$ and the second covariance matrix $Cov(X_i)$ are the n-dimensional vectors v that satisfies:

$$Cov(X_a)v = \lambda \cdot Cov(X_i)v,$$

where $\lambda$ is a scalar, which is a generalized eigenvalue.

7. The method as set forth in claim 6, wherein in ranking the candidate keywords, a first generalized eigenvector $v_1$ that corresponds to a largest generalized eigenvalue $\lambda_1$ is used to rank the candidate keywords, such that if $v = \{v_{11}, v_{12}, \ldots, v_{1n}\}$, then the $i^{th}$ component $v_{1i}$ represents a strength of the $i^{th}$ candidate keyword $w_i$, with the candidate keywords being ranked according to their eigenvector ranking, as follows: $w'_n < w'_{n-1} < \ldots < w'_1$.

8. The method as set forth in claim 7, wherein the time-series of keyword counts are retrieved from social media text.

9. A computer program product for identifying predictive keywords and advertising based on the predictive keywords, the computer program product comprising executable instructions encoded on a non-transitory computer-readable medium, such that upon execution of the instructions, one or more processors perform operations of:
    receiving time-series of keyword counts, the time-series of keyword counts having a plurality of candidate keywords;

separating the time-series of keyword counts into a group of time-series from active periods and a group of time-series from inactive periods;

generating a first covariance matrix for the group of time-series from active periods and a second covariance matrix for the group of time-series from inactive periods;

generating generalized eigenvectors between the two covariance matrices;

ranking the candidate keywords based on the generalized eigenvectors, such that candidate keywords having a rank exceeding a predetermined threshold are designated as predictive keywords;

providing the predictive keywords to a machine learning system that generates a forecast regarding a particular product based on the predictive keywords; and causing a server for a social network platform to push an advertisement associated with the particular product for display on a social media user's account.

10. The computer program product as set forth in claim 9, wherein the generalized eigenvectors $\{v_1, v_2, \ldots, v_n\}$ between the first covariance matrix $Cov(X_a)$ and the second covariance matrix $Cov(X_i)$ are the n-dimensional vectors v that satisfies:

$$Cov(X_a)v = \lambda \cdot Cov(X_i)v,$$

where $\lambda$ is a scalar, which is a generalized eigenvalue.

11. The computer program product as set forth in claim 10, wherein in ranking the candidate keywords, a first generalized eigenvector $v_l$ that corresponds to a largest generalized eigenvalue $\lambda_1$ is used to rank the candidate keywords, such that if $v_1 = \{v_{11}, v_{12}, \ldots, v_{1n}\}$, then the $i^{th}$ component $v_{1i}$ represents a strength of the $i^{th}$ candidate keyword $w_i$, with the candidate keywords being ranked according to their eigenvector ranking, as follows: $w'_n < w'_{n-1} < \ldots < w'_1$.

12. The computer program product as set forth in claim 11, wherein the time-series of keyword counts are retrieved from social media text.

* * * * *